US006666026B2

(12) United States Patent
Jungsch et al.

(10) Patent No.: US 6,666,026 B2
(45) Date of Patent: Dec. 23, 2003

(54) PROCESS FOR PREHEATING SUCTION AIR BY WASTE HEAT IN POWER ENGINES

(75) Inventors: Wolfgang Jungsch, Sennewitz (DE); Ralf Weber, Halle (DE)

(73) Assignee: Energieversorgung Halle GmbH, Halle (DE)

( * ) Notice: Subject to any disclaimer, the term of this patent is extended or adjusted under 35 U.S.C. 154(b) by 279 days.

(21) Appl. No.: 09/194,596

(22) PCT Filed: May 30, 1997

(86) PCT No.: PCT/DE97/01090

§ 371 (c)(1),
(2), (4) Date: Jan. 26, 1999

(87) PCT Pub. No.: WO97/46796

PCT Pub. Date: Dec. 11, 1997

(65) Prior Publication Data

US 2002/0066275 A1 Jun. 6, 2002

(30) Foreign Application Priority Data

May 31, 1996 (DE) .......................................... 196 22 057

(51) Int. Cl.[7] ............................................... F02C 7/047
(52) U.S. Cl. ....................................... 60/772; 60/39.093
(58) Field of Search ............................. 60/39.02, 39.07, 60/39.093, 39.52, 772, 785

(56) References Cited

U.S. PATENT DOCUMENTS 2,508,397 A    5/1950   Kane
4,328,666 A    5/1982   Cummins, Jr.
4,561,245 A   12/1985   Ball
5,449,961 A    9/1995   Ludwig et al.

FOREIGN PATENT DOCUMENTS

| DE | 865 842    | 2/1953  |
| DE | 1 601 602  | 12/1967 |
| DE | 16 01 602  | 1/1971  |
| DE | 17 51 613  | 4/1971  |
| DE | 43 37 674  | 5/1994  |
| FR | 2 552 816  | 4/1985  |
| GB | 592 091    | 9/1947  |
| JP | 60113034   | 6/1985  |

OTHER PUBLICATIONS

Patent Abstracts of Japan, vol. 009, No. 268 (M-424), Oct. 25, 1985.
Pons Collins, German-English Dictionary, 1997, p. 1701, p. 18, p. A and p. B.

Primary Examiner—Louis J. Casaregola
(74) Attorney, Agent, or Firm—Collard & Roe, P.C.

(57) ABSTRACT

The present invention proposes a process and a device which permit to improve the efficiency of energetic gas turbines operating in user regions with outside temperatures from −5° C. to +5° C. Unlike in the state of the art, no heat is withdrawn in this connection from the gas compressor (3) when the heat requirement rises in the overall intake system, but successively by using first the off-air heated by the generator (2) for heating the intake air in the intake duct (12, 12') and subsequently withdrawing additional heat in the form of the heat of an off-heat system (8) generated at the end of the heat circulation. When additional heat is required, heat can be withdrawn from the compressor (3) via a bypass conduit (20).

10 Claims, 2 Drawing Sheets

PROCESS FOR PREHEATING SUCTION AIR BY WASTE HEAT IN POWER ENGINES

BACKGROUND OF THE INVENTION

1. Field of the Invention

The present invention is concerned with a process and a device for effectively utilizing exhaust heats in connection with high-power engines in particular with an antifreeze system for preventing the formation of ice in the air intake systems of an energetic gas turbine.

2. The Prior Art

Such antifreeze systems of energetic gas turbines are well-known in the state of the art. In connection with the known antifreeze system for preventing icing and undercooling in the operating air intake and filter systems of the turbine, as well as in the generator cooling system, a part current of air is withdrawn downstream of a compressor, which serves for supplying the combustion chamber for the turbine. Said withdrawn part current of air effects a reduction in the performance, which is caused by both the increase in the intake temperature and the not insignificant withdrawal of air at the end of the compressor. This, of course, has an adverse effect on the overall energy balance of the operating system for generating the respective form of energy.

The power engine (generator) generating the energy is generally driven by a gas turbine, whereby the compressor, the combustion chamber and the turbine are accommodated in a common housing. The operating machine, in the present case a gas turbine, requires as operating medium great amounts of external air, which has to be subjected to filtration. The power engine, in the present case a generator, heats up considerably in the course of the operation and, therefore, has to be cooled with the help of a special gas cooling system. As a rule, external air is used as gas, whereby the problem arises that at certain excessively low outside temperatures and excessively high relative air humidity, ice may form in the total air intake system, which may lead to considerable damaging effects in the operating system. In order to prevent such formation of ice, provision is made in the state of the art that when the heat requirement increases, i.e., at dropping outside temperatures, hot air is withdrawn at the end of the compressor via a defined control valve, and then readmitted into the air inlet system. It is possible with the help of this measure to maintain the temperature in the region of the air inlet of the air intake system between about 3° C. and 5° C. The amount of gas withdrawn from the compressor comes in this connection to approximately 5 kg/s at a temperature of 400° C. Less operating air is thus available to the gas turbine, which finally reduces the electric terminal power on the generator.

SUMMARY OF THE INVENTION

As such power losses are not inconsiderable, the object of the present invention is to at least minimize the power losses due to the application of antifreeze devices.

Therefore, the object of the present invention is to make available a process and a device which minimize the losses of the effective capacity of the power machine with rising heat requirements in the antifreeze system of gas turbine installations.

The process as defined by the invention for preventing the formation of ice in the gas mixture conduit systems with the use of already heated gas in the total operating system is characterized in that heat is withdrawn in a defined sequence at energetically favorable points in a way such that the effective capacity of the operating system is optimized.

The device operating according to the process as defined by the invention is characterized by
- a multiway gas conduction system, which allocates the streams of gas to different conduits, and which is arranged in the exhaust air duct of the cooling system of the power engine;
- a controlling system for withdrawing heat on the off-heat system of the operating system; and
- a bypass conduit with a control valve between the outlet of the gas compressor and the gas inlet opening of the air intake and cooling system.

An advantageous sequence of heat withdrawal in the form of heat already heated in the operating system is that the heated generator exhaust air exiting from the power machine is first supplied to the air intake system, and when the heat requirement rises further, the heat of the off-heat system is then withdrawn at the end of the heat circulation of the operating system, and, as a further possibility, the heat of the gas compressor system is withdrawn. An advantageously suitable point for withdrawing heat from the off-heat system is the site where the gas temperature is between 120° C. and 200° C. Furthermore, it is advantageous if the heat is withdrawn from the off-heat system downstream of the heat exchangers of the process connected downstream; however, the temperature level has to be sufficiently high.

Also, it is advantageous to conduct the heated generator air via a multiway gas conduction system, whereby such multiway gas conduction system is a three-way control valve, as a rule.

Furthermore, it is advantageous to conduct the heat of the off-heat system via a controlling device, so that the heat requirement to be withdrawn can be controlled according to a defined specification.

If the heat requirement rises further, or if the first two part systems fail, or if special operating cases occur, a defined amount of heat has to be withdrawn according to the invention at the end of the compressor, so that the operating temperature is maintained at from 3° C. to 5° C. in order to prevent the formation of ice in the air intake system.

The heat to be withdrawn in the individual heat systems has to be determined according to the invention pursuant to a defined functional specification. An advantageous mixing ratio of generator exhaust air:off-heat gas:external air is given if the relative air humidity does not reach its maximum value in the critical spots in the air intake system. In the determination of the optimal mixing ratio of the individual streams of gas, the further calculations are advantageously and, according to the invention, governed by various parameters such as, for example the outside air temperature ($T_a$) and the relative air humidity ($W_{rel}$). Said parameters, of course, are specified only by way of example, and are supplemented by a great number of additional important and required parameters in the determination function.

The advantageous regulation of the streams of gas in the individual heat feed conduits is controlled with defined setting elements such as control valves and air flaps.

BRIEF DESCRIPTION OF THE DRAWING

The present invention is explained in greater detail in the following with the help of drawings, in which.

DETAILED DESCRIPTION OF PREFERRED EMBODIMENTS

Figure 1:
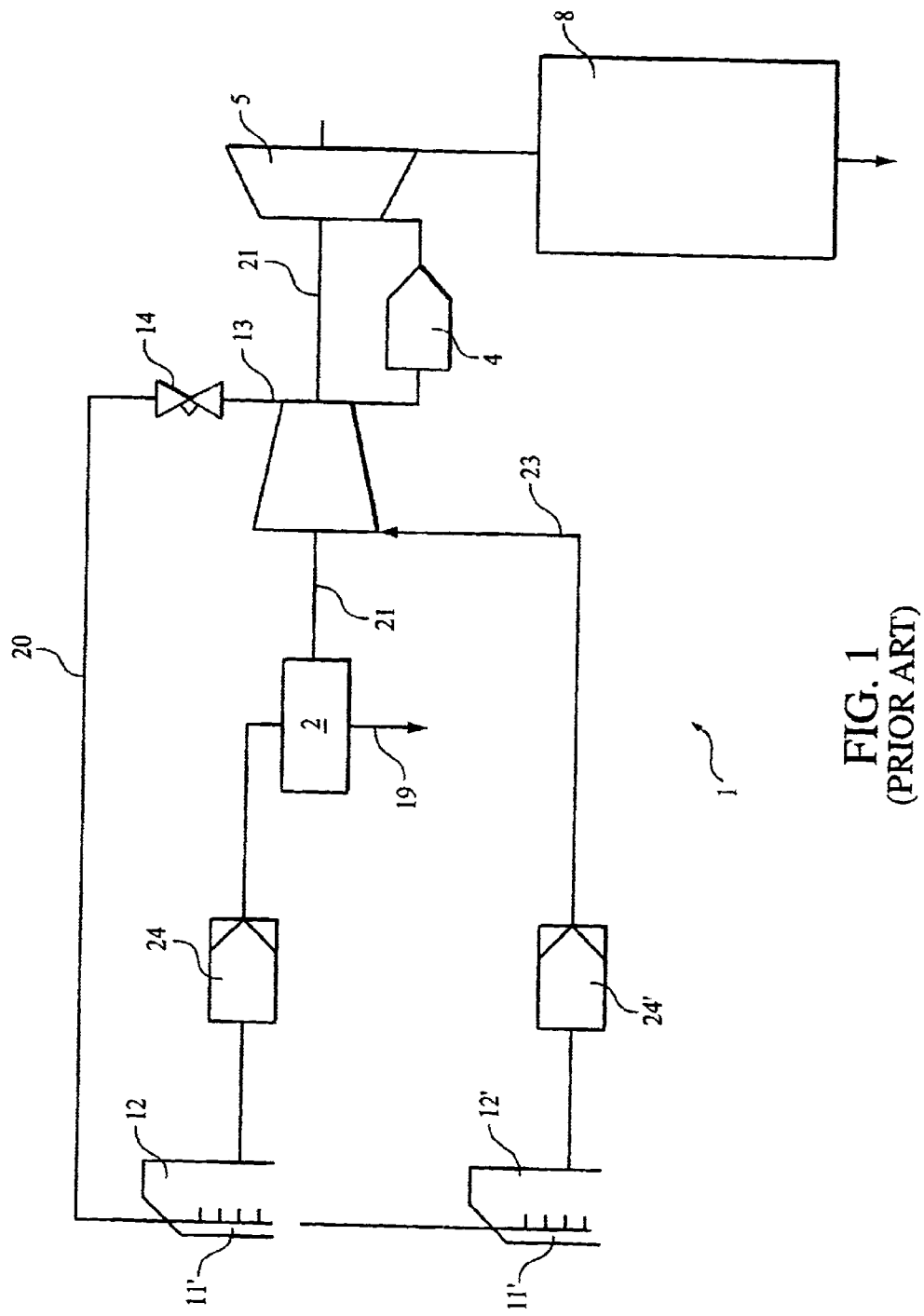
FIG. 1 shows a block diagram of the operating system (1) operated in the state of the art, with a generator (2) and a turbine (5), where the rising heat requirement for the antifreeze system is withdrawn from the compressor (3).

FIG. 1 shows in a block diagram the operating system 1 of a gas turbine installation as commonly employed in the state of the art. The generator 2, the compressor 3 and the turbine 5 are supported on a common shaft 21. The common housing for compressor 3 and gas turbine 5, which is not described herein in greater detail, consists of two housing sections between the front bearing block and the housing of the turbine outlet. Compressor 3 receives the required amount of air from the air conduction system via conduit 23. The required amount of air is received in compressor 3 via the air inlet device 12' and an air filter 24 at a rate of about 140 m³/s. At an outside temperature of +5° C. to −5° C. and a relative air humidity of >70%, the temperature of the air in conduit 23 is to amount to approximately 3° C., whereby the air humidity there should be <95%. The air conduction system substantially consists of an air intake duct 12, 12' and a great number of air nozzles 11, 11', which, when the heat requirement rises in the air intake system of the installation, blow hot air into the air intake ducts 12, 12' in order to raise the temperature, if need be, in order to prevent the formation of ice on the air filters 24, 24'.

The precompressed air or compressed gas in compressor 3 is supplied to the combustion chamber 4, where the combustible gases are burned and drive turbine 5 with the energy being released. As turbine 5 and generator 2 are mounted on one shaft, the terminal capacity of the generator is thus substantially determined or influenced by the output of turbine 5. The heat exiting from turbine 5 is subsequently supplied to a so-called off-heat system 8. In the present case, off-heat system 8 is a two-stage steam generator with a condensate preheater 17 and another heat exchanger, in which a multitude of tube coils are accommodated. The residual heat remaining downstream of off-heat device 8 is discharged again into the atmosphere.

As a rule, the antifreeze system has to start to operate at outside temperatures of −5° C. to +5° C. in order to prevent icing within the system. For this purpose, a part current of air is withdrawn from compressor 3 at end 13 of compressor 3 via a control valve 14 and supplied via a conduit 20 to air inlet device 12, 12' via the nozzles 11, 11'. The withdrawn heated and compressed amount of air at end 13 of compressor 3 amounts to maximally 5 kg/s at a temperature of 400° C. Based on an average operating time of about 1,400 hours annually, this leads to a reduction of the efficiency of the gas turbine, so that the possible electrical yield is reduced during that time by about 7,000 MWh, causing an extra consumption of natural gas of approximately 250,000 m³, whereby the influence of the high component of condensation work for compensating the above-mentioned loss in yield during the heating period is not included.

Due to the high development of heat in the course of energy generation of generator 2, it is necessary to cool the windings and the entire generator with a gas or with relatively dry air. This is accomplished with an air current of about 24 m³/s. The required cooling air is received in generator 2 via the air inlet system 12 and the filter 24. In the generator, the air is heated to about 50° C. and subsequently discharged into the atmosphere.

Figure 2:
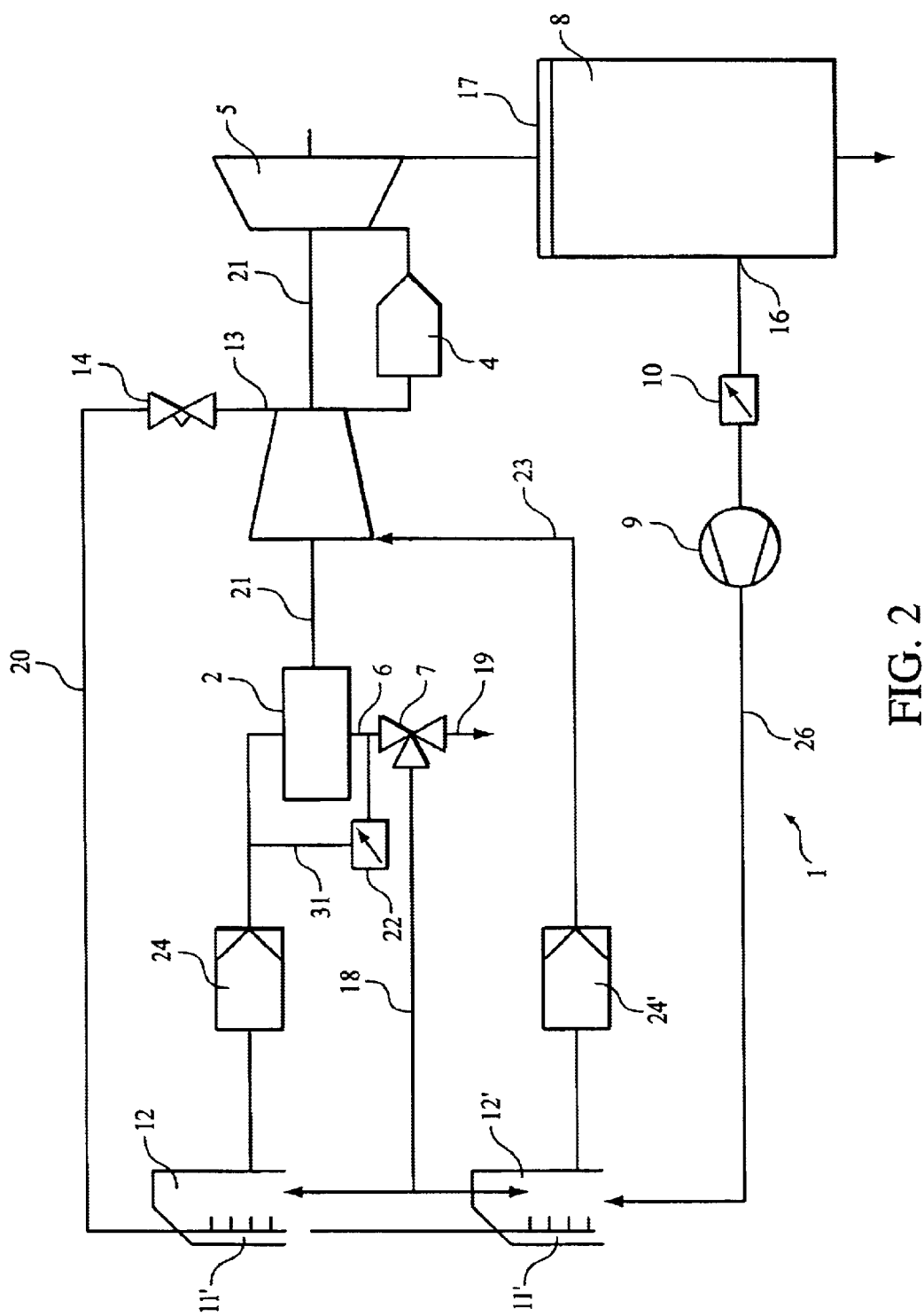
FIG. 2 shows the block diagram of an operating system (1) as defined by the invention, where the rising heat requirement is withdrawm from various heat sources of the operating system (1).

In FIG. 2, the operating system 1 with the air conduction system as defined by the invention is shown in a block circuit diagram. The functions relating to the operation of gas turbine 5 and to the operation of compressor 3 connected therewith, as well as to the operation of generator 2 are basically the same as those in the block diagram shown in FIG. 1 and are therefore not described again herein.

As stated above, the antifreeze system is put into operation when the outside temperature drops to below +3° C. This is the rule in the winter months, with a few exceptions.; According to the invention, when the heat requirement in the air conduction system of the entire installation of operating system 1 rises, the heated off-air of generator 2 is conducted via a three-way gate valve 7 which, with the help of setting elements not shown here, allocates the amounts of air to the respective conduits 18, 19. Conduit 19 leads into the atmosphere, whereas conduit 18 returns the heated gas from generator 2 to the air intake ducts of air intake device 12, 12', which heats the air present in said ducts. The quantity of the heated amount of air to be admitted is determined by a function as defined by the invention, which evaluates defined data measured and recorded online and parameters. If the heat requirement rises further, i.e., if the temperature of the outside air continues to drop, the amount of heat derived from the exhaust air of the generator no longer suffices for preventing hazardous formation of ice in the air cooling system. So as to compensate the extra requirement of heat, heat is now withdrawn according to the invention from off-heat system 8 in a suitable location 16. Said suitable location has to be selected based on a temperature potential that excludes the separation of moisture in the intake tract. Furthermore, the suitable location has to be selected in such a manner that the generation of boiler steam is not impaired. The volume of the air current and the amount of heat associated therewith that has to be withdrawn from off-heat system 8, are in turn determined by the control function that evaluates the recorded parameters or measured data. Controlling device 9, 10 controls the amount of air required from off-heat system 8, whereby a check valve 10 and a blower 9 are connected in series in conduit 26.

In addition to multiple measurements of the outside temperature ($T_a$) and the relative air humidity ($W_{rel}$), the control function as defined by the invention has to take into account measurements at defined reference points with the highest deviation from mean values, whereby the computation of the maximum value of the air humidity in intake conduit 23 plays a decisive role. When the final position of the check valves of the generator air return line is reached, said part system is left 100% open and a further increase in the heating span is obtained by changing the rotary speed of flue gas return blower 9. Another important parameter is supplied to the computing function from the position of preconducting device 10 and from the amount of gas contained in the returned flue gas. Said amount has to be limited in such a way that no excess moisture is formed in the mixed intake air. The system is blocked if the CO-values are high.

As a primary reserve intervening as the last measure, an amount of heat is withdrawn, if need be, from compressor 3 via conduit 20 and control valve 14 and supplied to air inlet system 12, 12'. Thus there is a first bypass conduit 20 with a control valve 14. Also there is a second bypass conduit 31 with a second control valve 22.

The process as defined by the invention and described above and the device as defined by the invention and serving for said process are universally valid and are to be applied to all machines and systems operating according to said principle.

What is claimed is:

1. A method of preventing the formation of ice in a gas mixture line, with an air intake device of a system (1), comprising a gas compressor device (3) and a gas turbine (5); and upon occurrence of a preset nominal value of an external air temperature (Ta) and a relative air humidity (Wrel), supplying already heated gas to said air intake device.

2. The method according to claim 1, comprising first supplying the heated gas to first and second air intake devices (12, 12'); and when a heat requirement has increased further, withdrawing required heat from an exhaust heat device (8) of the gas turbine system (1); and when the heat requirement has increased further, withdrawing required heat from the gas compressor device (3).

3. The method according to claim 1, comprising conducting the heated gas through a multi-way gas conduction device (7).

4. The method according to claim 2, comprising conducting the heat from the exhaust heat device (8) through a controlling device (9, 10).

5. The method according to claim 2, comprising at an end (13) of the gas compressor device (3), supplying the heat to the first air intake device (12) through a control valve (14).

6. The method according to claim 2, comprising withdrawing the heat of the exhaust heat device (8) at a point where a gas temperature is between 120° C. and 200° C.

7. The method according to claim 6, comprising locating a heat withdrawal point (16) on the exhaust heat device (8) downstream of a condensate preheater (17).

8. The method according to claim 2, comprising determining an amount of heat to be withdrawn from the exhaust heat device (8) that does not exceed a defined preset value, whereby the value is dependent upon an amount of air required in the first and second air intake devices (12, 12').

9. The method according to claim 2, comprising controlling a mixing ratio of each stream of gas for the first and second air intake devices depending on required amounts of gas.

10. The method according to claim 2, comprising adjusting a mixing ratio of each stream of gas in such a way that a temperature in the first and second air intake devices (12, 12') is between +3° C. and +5° C.

* * * * *